United States Patent
Yao et al.

(10) Patent No.: US 10,063,073 B2
(45) Date of Patent: Aug. 28, 2018

(54) USB POWER CONVERTER WITH BLEEDER CIRCUIT FOR FAST CORRECTION OF OUTPUT VOLTAGE BY DISCHARGING OUTPUT CAPACITOR

(71) Applicant: Dialog Semiconductor Inc., Campbell, CA (US)

(72) Inventors: Jianming Yao, Cupertino, CA (US); Yimin Chen, San Jose, CA (US); Yong Li, San Jose, CA (US); Junjie Zheng, Santa Clara, CA (US); Dickson T. Wong, Burlingame, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 299 days.

(21) Appl. No.: 14/284,172

(22) Filed: May 21, 2014

(65) Prior Publication Data

US 2015/0340890 A1 Nov. 26, 2015

(51) Int. Cl.
*H02J 7/00* (2006.01)
*H02M 3/335* (2006.01)

(52) U.S. Cl.
CPC .......... *H02J 7/0042* (2013.01); *H02J 7/0029* (2013.01); *H02J 7/0052* (2013.01); *H02M 3/33523* (2013.01); *H02J 2007/0059* (2013.01); *H02J 2007/0062* (2013.01)

(58) Field of Classification Search
CPC ............................. H02J 7/0052; H02J 7/0042
USPC ....................................................... 320/114
See application file for complete search history.

(56) References Cited

U.S. PATENT DOCUMENTS

| | | | | | |
|---|---|---|---|---|---|
| 3,579,240 | A | * | 5/1971 | Deming | G08C 19/12 340/13.25 |
| 3,614,584 | A | * | 10/1971 | Burkett | H02J 7/0091 320/152 |
| 3,704,393 | A | * | 11/1972 | Digney, Jr. | H03K 3/537 307/106 |
| 3,708,738 | A | * | 1/1973 | Crawford | H02J 7/0031 320/134 |
| 3,792,309 | A | * | 2/1974 | McDonald | H05B 41/34 315/200 A |
| 3,863,129 | A | * | 1/1975 | Yamauchi | H02J 7/0086 320/139 |

(Continued)

FOREIGN PATENT DOCUMENTS

| | | | | | |
|---|---|---|---|---|---|
| DE | 3925174 A1 | * | 2/1991 | | H02H 3/202 |
| JP | 11341800 A | * | 12/1999 | | |
| KR | 20150074444 A | * | 7/2015 | | G06F 3/044 |

OTHER PUBLICATIONS

Derwent report for Azuma JP 11341800 (Published online either 2000 or 2008, Thomson Reuters).*

(Continued)

*Primary Examiner* — Robert Grant
*Assistant Examiner* — John Trischler
(74) *Attorney, Agent, or Firm* — Fenwick & West LLP (57) ABSTRACT

A universal serial bus (USB) charger provides power to a client device. A USB connector interfaces with a client device and receives a request for the output voltage of the USB charger to be at a specific value. If the requested voltage level is lower than the current output voltage level, the output voltage level is set to the requested level and a bleeder circuit is enabled to discharge the output capacitor of the USB charger.

19 Claims, 6 Drawing Sheets

(56) References Cited

U.S. PATENT DOCUMENTS

| | | | | |
|---|---|---|---|---|
| 3,889,090 A * | 6/1975 | MacKenzie | H05B 6/062 | 219/626 |
| 3,953,768 A * | 4/1976 | Meredith | F21L 4/00 | 315/127 |
| 4,024,430 A * | 5/1977 | Schneider | H03K 5/08 | 315/207 |
| 4,025,817 A * | 5/1977 | Wollschleger | G03B 15/0463 | 310/339 |
| 4,064,447 A * | 12/1977 | Edgell | B23K 3/0323 | 200/522 |
| 4,066,937 A * | 1/1978 | Pfarrer | H02P 1/445 | 310/198 |
| 4,084,123 A * | 4/1978 | Lineback | B23K 3/0323 | 30/DIG. 1 |
| 4,088,928 A * | 5/1978 | Waehner | H04N 3/185 | 307/44 |
| 4,191,917 A * | 3/1980 | Brown | H01M 10/46 | 307/150 |
| 4,210,846 A * | 7/1980 | Capewell | H05B 41/392 | 315/121 |
| 4,275,436 A * | 6/1981 | Peterson | H02M 3/156 | 323/223 |
| 4,388,583 A * | 6/1983 | Krueger | H01M 10/44 | 310/311 |
| 4,402,033 A * | 8/1983 | Mayer | H01H 47/32 | 361/187 |
| 4,437,148 A * | 3/1984 | Suranyi | G05F 3/18 | 323/274 |
| 4,621,225 A * | 11/1986 | Birk | H02J 7/0072 | 320/139 |
| 4,654,770 A * | 3/1987 | Santurtun | H05G 1/54 | 361/93.9 |
| 4,698,580 A * | 10/1987 | Yang | H02J 7/008 | 320/139 |
| 4,730,122 A * | 3/1988 | Dreibelbis | G05F 1/46 | 307/130 |
| 4,855,622 A * | 8/1989 | Johnson | H03K 17/16 | 326/19 |
| 4,870,534 A * | 9/1989 | Harford | H02H 9/005 | 361/111 |
| 4,910,654 A * | 3/1990 | Forge | H02H 9/001 | 323/908 |
| 5,013,993 A * | 5/1991 | Bhagwat | H02J 7/0091 | 320/150 |
| 5,023,527 A * | 6/1991 | Erdman | F23N 3/082 | 318/400.03 |
| 5,036,850 A * | 8/1991 | Owens | A61N 1/36021 | 607/46 |
| 5,063,929 A * | 11/1991 | Bartelt | A61N 1/36021 | 607/46 |
| 5,065,083 A * | 11/1991 | Owens | A61N 1/378 | 320/127 |
| 5,069,211 A * | 12/1991 | Bartelt | A61N 1/36021 | 607/46 |
| 5,166,595 A * | 11/1992 | Leverich | H02J 7/008 | 320/139 |
| 5,289,101 A * | 2/1994 | Furuta | H02J 7/022 | 320/145 |
| 5,436,791 A * | 7/1995 | Turano | F42D 1/045 | 102/218 |
| 5,459,652 A * | 10/1995 | Faulk | H02M 1/36 | 323/901 |
| 5,523,665 A * | 6/1996 | Deaver | H02H 3/023 | 320/135 |
| 5,615,097 A * | 3/1997 | Cross | H02H 7/1252 | 361/111 |
| 5,638,262 A * | 6/1997 | Brown | H02M 3/33523 | 363/19 |
| 5,675,464 A * | 10/1997 | Makaran | H02H 7/093 | 361/115 |
| 5,708,549 A * | 1/1998 | Croft | H02H 9/046 | 361/111 |
| 5,796,182 A * | 8/1998 | Martin | H02J 9/062 | 307/46 |
| 5,822,200 A * | 10/1998 | Stasz | H02M 3/33507 | 323/906 |
| 5,835,361 A * | 11/1998 | Fitzgerald | H02H 7/1213 | 363/21.03 |
| 5,841,641 A * | 11/1998 | Faulk | H02M 3/335 | 363/21.14 |
| 5,949,212 A * | 9/1999 | Cherry | H02J 7/355 | 320/101 |
| 6,018,229 A * | 1/2000 | Mitchell | G06F 1/26 | 320/112 |
| 6,088,209 A * | 7/2000 | Sink | H02H 9/041 | 361/111 |
| 6,148,258 A * | 11/2000 | Boisvert | F02P 19/022 | 123/145 A |
| 6,172,608 B1 * | 1/2001 | Cole | G06K 7/0008 | 340/10.4 |
| 6,243,276 B1 * | 6/2001 | Neumann | H02H 5/047 | 323/901 |
| 6,301,131 B1 * | 10/2001 | Yoshida | G05F 3/18 | 363/126 |
| 6,359,794 B1 * | 3/2002 | Real | H02J 9/062 | 307/66 |
| 6,385,058 B1 * | 5/2002 | O'Meara | H02M 3/33561 | 363/21.01 |
| 6,424,125 B1 * | 7/2002 | Graham | H02H 3/14 | 320/166 |
| 6,614,811 B1 * | 9/2003 | Alaimo | H04L 12/2856 | 370/498 |
| 6,737,845 B2 * | 5/2004 | Hwang | H02M 1/0845 | 323/222 |
| 7,054,173 B2 * | 5/2006 | Rayner | H02M 5/458 | 361/16 |
| 7,157,807 B2 * | 1/2007 | Lubomirsky | H02M 7/064 | 307/18 |
| 7,200,015 B1 * | 4/2007 | Mirskiy | H02M 1/36 | 363/47 |
| 7,274,112 B2 * | 9/2007 | Hjort | H02J 9/062 | 307/64 |
| 7,466,042 B2 * | 12/2008 | Eldredge | H02M 3/157 | 307/154 |
| 7,701,739 B2 * | 4/2010 | Mollo | G06F 1/26 | 363/142 |
| 7,729,190 B2 * | 6/2010 | Xi | G11O 5/147 | 365/185.25 |
| 7,737,580 B2 * | 6/2010 | Hjort | H02J 7/0047 | 307/46 |
| 7,855,472 B2 * | 12/2010 | Hjort | H02J 7/0047 | 307/64 |
| 7,986,577 B2 * | 7/2011 | Lee | G11C 7/04 | 365/189.09 |
| 8,053,927 B2 * | 11/2011 | Hjort | H02J 7/0047 | 307/64 |
| 8,054,039 B2 * | 11/2011 | Bauerle | B60L 3/003 | 320/109 |
| 8,072,186 B2 * | 12/2011 | Wang | H02J 7/0052 | 320/107 |
| 8,093,905 B2 * | 1/2012 | Yamanaka | H02J 1/14 | 324/548 |
| 8,154,245 B2 * | 4/2012 | Veselic | G06F 1/266 | 320/106 |
| 8,154,258 B2 * | 4/2012 | Pappas | H01G 9/155 | 320/166 |
| 8,203,857 B2 * | 6/2012 | Ohshima | H02M 3/07 | 327/536 |
| 8,208,275 B2 * | 6/2012 | Goins | H02M 1/088 | 361/111 |
| 8,253,403 B2 * | 8/2012 | Chen | H02M 3/158 | 323/282 |
| 8,362,754 B2 * | 1/2013 | Maebara | H02M 7/53871 | 307/109 |
| 8,369,051 B2 * | 2/2013 | Skatulla | H02M 1/36 | 361/18 |
| 8,421,400 B1 * | 4/2013 | Khanna | H02J 7/0026 | 320/101 |

(56) References Cited

U.S. PATENT DOCUMENTS

| | | | |
|---|---|---|---|
| 8,674,631 B2* | 3/2014 | Kono | B60L 3/04 187/290 |
| 8,896,231 B2* | 11/2014 | Brandt | H05B 37/02 315/119 |
| 8,988,910 B2* | 3/2015 | Hsu | H02M 7/06 363/126 |
| 9,203,328 B2* | 12/2015 | Freeman | H02M 3/33507 |
| 9,246,406 B2* | 1/2016 | Freeman | H02M 3/33507 |
| 2001/0028571 A1* | 10/2001 | Hanada | H02H 9/001 363/50 |
| 2002/0196644 A1* | 12/2002 | Hwang | H02M 1/0845 363/89 |
| 2003/0206387 A1* | 11/2003 | Newman, Jr. | H05B 39/048 361/93.1 |
| 2003/0210022 A1* | 11/2003 | Takemura | H02M 3/1584 323/282 |
| 2004/0207361 A1* | 10/2004 | Utsunomiya | H02J 7/345 320/103 |
| 2005/0052886 A1* | 3/2005 | Yang | H02M 1/36 363/49 |
| 2005/0141252 A1* | 6/2005 | Mollo | G06F 1/26 363/101 |
| 2005/0264256 A1* | 12/2005 | Choi | H02J 7/345 320/103 |
| 2006/0181241 A1* | 8/2006 | Veselic | G06F 1/266 320/107 |
| 2006/0279258 A1* | 12/2006 | Jung | H02J 7/025 320/166 |
| 2008/0074910 A1* | 3/2008 | Casteel | H02P 9/105 363/54 |
| 2008/0122518 A1* | 5/2008 | Besser | H02J 3/382 327/518 |
| 2008/0144420 A1* | 6/2008 | Xi | G11C 5/147 365/226 |
| 2008/0232182 A1* | 9/2008 | Lee | G11C 7/04 365/203 |
| 2008/0238388 A1* | 10/2008 | Sato | H02M 3/158 323/282 |
| 2009/0072796 A1* | 3/2009 | Wang | H02J 7/0052 320/164 |
| 2009/0196079 A1* | 8/2009 | Nathan | H02M 1/32 363/50 |
| 2009/0302816 A1* | 12/2009 | Kunimatsu | H02M 1/36 323/282 |
| 2010/0007361 A1* | 1/2010 | Yamanaka | H02J 1/14 324/678 |
| 2010/0033882 A1* | 2/2010 | Skatulla | H02M 1/36 361/18 |
| 2010/0066311 A1* | 3/2010 | Bao | H02J 7/0073 320/162 |
| 2010/0090663 A1* | 4/2010 | Pappas | H01G 9/155 320/166 |
| 2010/0148741 A1* | 6/2010 | Chen | H02M 3/158 323/285 |
| 2010/0156355 A1* | 6/2010 | Bauerle | B60L 3/003 320/145 |
| 2010/0176750 A1* | 7/2010 | West | F21L 4/027 315/362 |
| 2010/0225170 A1* | 9/2010 | Hjort | H02J 7/0047 307/65 |
| 2010/0308655 A1* | 12/2010 | Wachi | H02M 1/36 307/31 |
| 2011/0127950 A1* | 6/2011 | Veselic | G06F 1/266 320/107 |
| 2011/0133655 A1* | 6/2011 | Recker | H02J 9/02 315/159 |
| 2011/0227415 A1* | 9/2011 | Hjort | H02J 7/0047 307/66 |
| 2011/0234020 A1* | 9/2011 | Lai | H02H 3/14 307/326 |
| 2011/0241629 A1* | 10/2011 | Jordan | H02M 3/07 320/166 |
| 2012/0020131 A1* | 1/2012 | Chan | H02J 9/005 363/126 |
| 2012/0081068 A1* | 4/2012 | Odaohhara | H02J 7/045 320/107 |
| 2012/0139477 A1* | 6/2012 | Oglesbee | H02J 7/00 320/107 |
| 2012/0188794 A1* | 7/2012 | Chang | H02M 3/33507 363/16 |
| 2012/0201058 A1* | 8/2012 | Harrison | H02J 7/0044 363/53 |
| 2012/0277942 A1* | 11/2012 | Vilar | B60L 11/005 701/22 |
| 2012/0299546 A1* | 11/2012 | Gagne | H01L 27/0266 320/114 |
| 2013/0076301 A1* | 3/2013 | Bastami | H02J 7/0008 320/107 |
| 2013/0077364 A1* | 3/2013 | Urienza | H02M 7/2176 363/84 |
| 2013/0154515 A1* | 6/2013 | Brandt | H05B 37/02 315/307 |
| 2013/0154546 A1* | 6/2013 | Kleczewski | H02H 3/202 320/107 |
| 2013/0162235 A1* | 6/2013 | Harada | H02M 3/156 323/283 |
| 2013/0170261 A1* | 7/2013 | Lee | H02H 7/16 363/126 |
| 2013/0328415 A1* | 12/2013 | Lee | H02J 7/022 307/130 |
| 2013/0334881 A1* | 12/2013 | Jones | H02J 4/00 307/23 |
| 2013/0335038 A1* | 12/2013 | Lee | H02M 1/126 320/166 |
| 2013/0343090 A1* | 12/2013 | Eom | H02M 3/33507 363/16 |
| 2014/0049106 A1* | 2/2014 | Freeman | H02M 3/33507 307/31 |
| 2014/0049176 A1* | 2/2014 | Weaver, Jr. | H02M 3/33507 315/207 |
| 2014/0049991 A1* | 2/2014 | Freeman | H02M 3/33507 363/37 |
| 2014/0084687 A1* | 3/2014 | Dent | H02M 1/32 307/26 |
| 2014/0097686 A1* | 4/2014 | Huisman | H03K 5/2472 307/43 |
| 2014/0169047 A1* | 6/2014 | Hsu | H02M 7/06 363/44 |
| 2014/0192564 A1* | 7/2014 | Tang | H02M 3/33592 363/21.14 |
| 2014/0245030 A1* | 8/2014 | Helfrich | H02M 7/04 713/300 |
| 2014/0266074 A1* | 9/2014 | Herber | H02J 7/007 320/166 |
| 2014/0320075 A1* | 10/2014 | Baurle | G06F 13/4282 320/108 |
| 2014/0327393 A1* | 11/2014 | Lee | H02J 7/025 320/108 |
| 2014/0347005 A1* | 11/2014 | Zhou | H02J 7/007 320/107 |
| 2015/0036389 A1* | 2/2015 | Freeman | H02M 1/10 363/16 |
| 2015/0049520 A1* | 2/2015 | Xu | H02M 1/32 363/21.02 |
| 2015/0054451 A1* | 2/2015 | Rokusek | H02M 7/23 320/108 |
| 2015/0103568 A1* | 4/2015 | Del Carmen, Jr. | H02M 3/33507 363/21.16 |
| 2015/0109834 A1* | 4/2015 | Hsu | H02M 7/06 363/44 |
| 2015/0124499 A1* | 5/2015 | Eum | H02M 3/335 363/50 |
| 2015/0180244 A1* | 6/2015 | Jung | H02J 7/0055 320/107 |
| 2015/0357857 A1* | 12/2015 | Flock | B60L 3/04 318/504 |

(56) References Cited

U.S. PATENT DOCUMENTS

| | | | | |
|---|---|---|---|---|
| 2015/0357928 A1* | 12/2015 | Itakura | ............... | H02M 1/10 |
| | | | | 320/128 |
| 2016/0006341 A1* | 1/2016 | Mao | ............... | H02M 1/08 |
| | | | | 363/21.17 |
| 2016/0064977 A1* | 3/2016 | Chen | ............... | H02J 7/0052 |
| | | | | 320/114 |
| 2016/0064978 A1* | 3/2016 | Lei | ............... | H02J 7/0004 |
| | | | | 320/114 |
| 2016/0156277 A1* | 6/2016 | Weaver, Jr. | ............... | H02M 3/33507 |
| | | | | 363/37 |
| 2016/0233781 A1* | 8/2016 | Freeman | ............... | H02M 3/33507 |
| 2016/0268828 A1* | 9/2016 | Mao | ............... | H02J 7/022 |
| 2016/0322893 A1* | 11/2016 | Schinzel | ............... | H02M 1/088 |

OTHER PUBLICATIONS

Translation for Azuma 1131800.*
Human Translation of Azuma reference (fixes typo on p. 21 of mailed Jun. 6, 2016 translation).*
PCT International Search Report and Written Opinion, PCT Application No. PCT/US2015/024406, dated Jul. 6, 2015, 16 pages.
Chinese First Office Action, Chinese Application No. 201580026055.2, dated Apr. 9, 2018, 10 pages.

* cited by examiner

= USB POWER CONVERTER WITH BLEEDER CIRCUIT FOR FAST CORRECTION OF OUTPUT VOLTAGE BY DISCHARGING OUTPUT CAPACITOR

BACKGROUND

1. Field of Art

The disclosure generally relates to the field of universal serial bus (USB) chargers, and specifically to providing multiple charging voltages for faster charging.

2. Description of the Related Art

Universal serial bus (USB) is a connection standard used that can be used to interconnect multiple computing devices (e.g., a personal computer, a smartphone) and peripherals (e.g., a mouse, a keyboard, a camera) to each other. In addition to being able to connect computing devices and peripherals, a USB connector can also be used to deliver power. For instance, a USB connector may be used to provide power to charging the battery of mobile devices. Power can be provided from a host computing device or by a dedicated power supply (e.g., a charger).

When charging the battery of a mobile device, the charging speed is limited by the voltage and current provided through the USB connector. Current USB chargers only output a voltage of 5V, as specified by the USB standard, when delivering power to a mobile device. This greatly limits the speed of charging the mobile device.

Thus, it would be advantageous to be able to deliver an output voltage at a higher voltage level, in addition to the voltage specified by the USB standard, upon request from the mobile device for increasing the charging speed of the mobile device.

SUMMARY

A universal serial bus (USB) charger provides power to a client device. A USB connector interfaces with a client device and receives a request for the output voltage of the USB charger to be at a specific value. If the requested voltage level is lower than the current output voltage level, the output voltage level is set to the requested level and a bleeder circuit is enabled to discharge the output capacitor of the USB charger.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Universal Serial Bus (USB) Charger

Figure 1:
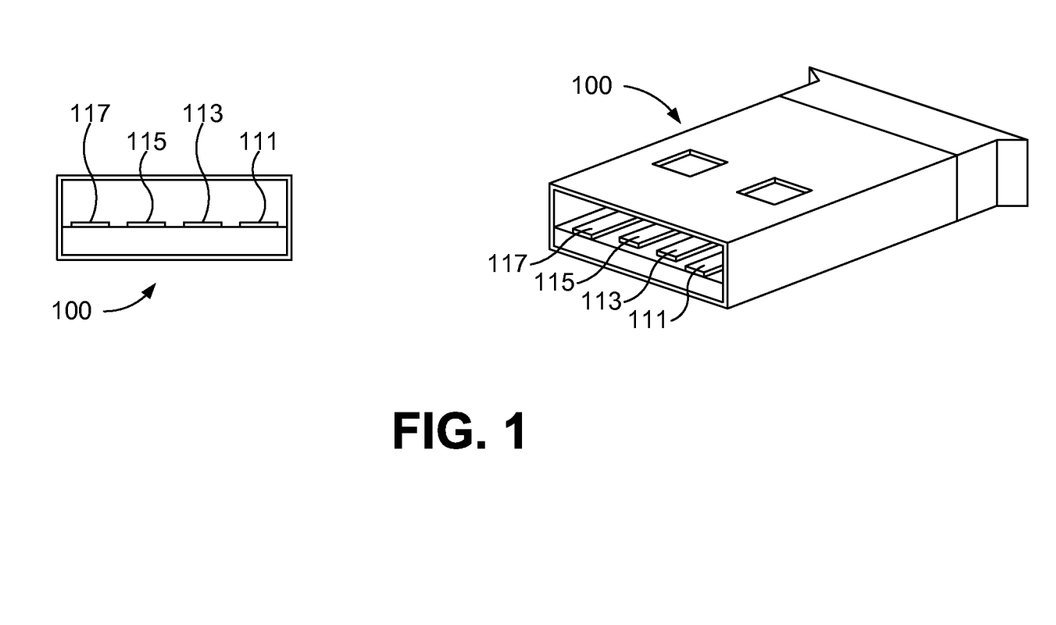
FIG. 1 illustrates an illustration of a universal serial bus (USB) connector.

FIG. 1 is an illustration of a universal serial bus (USB) connector. The USB connector 100 allows communication between two devices, such as a computer and a peripheral device. Additionally, USB connectors can also be used to provide energy to the peripheral device. USB connector 100 includes first terminal 111, second terminal 113, third terminal 115 and fourth terminal 117. Even though specific embodiments are described using a USB connector, other types of connectors that are capable of providing energy to a peripheral device may also be used.

In some embodiments, first terminal 111 and fourth terminal 117 are used for transferring power and second terminal 113 and third terminal 115 are used for transferring data. For instance, first terminal 111 may be used for transferring a supply voltage (e.g. $V_{dd}$) and fourth terminal 117 may be used for transferring a ground reference voltage (GND). Additionally, second terminal 113 may be used for transferring a differential data signal at plus or positive side and the third terminal 115 may be used for transferring a differential signal at minus or negative side.

In some embodiments, other types of USB connectors may be used instead of the one illustrated in FIG. 1. For example, a mini-USB or a micro-USB connector may be used instead of the USB connector of FIG. 1.

Figure 2:
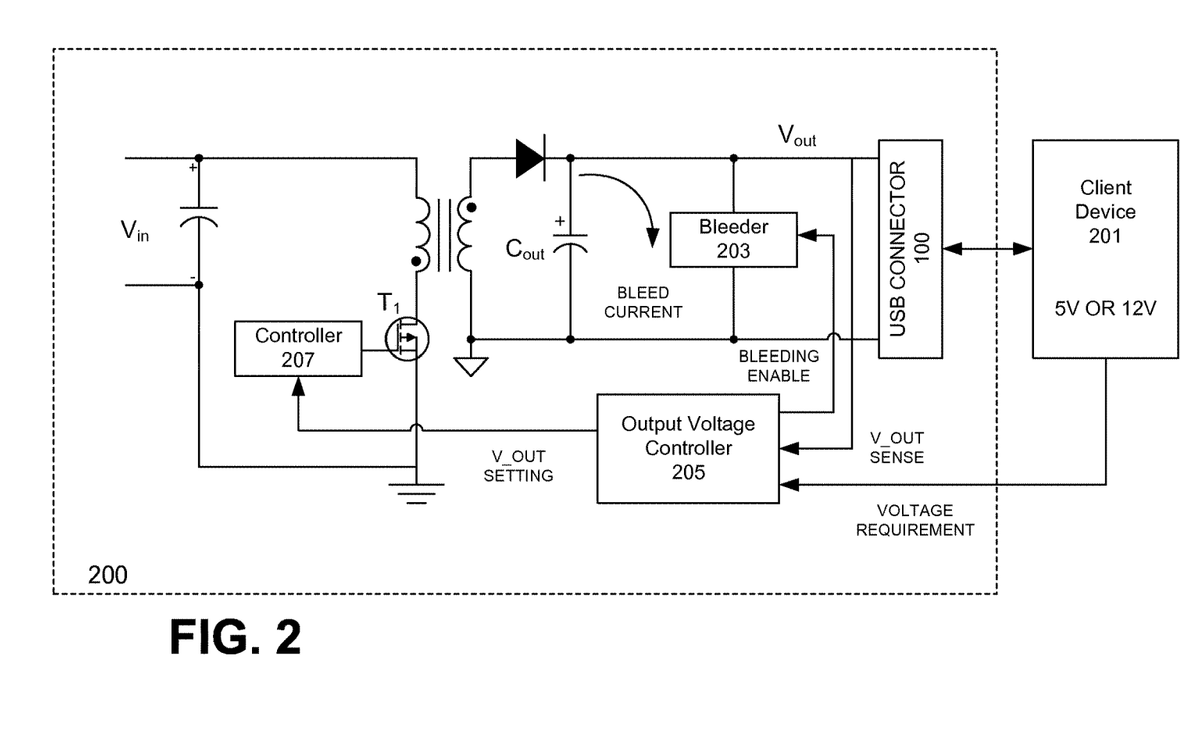
FIG. 2 illustrates a circuit diagram of a USB charger that is capable of providing an output voltage at multiple voltage levels, according to one embodiment.

FIG. 2 is a circuit diagram of a USB charger 200 that is capable of providing an output voltage at different voltage levels. In one embodiment, the USB charger 200 is capable of supplying an output voltage ($V_{out}$) at two different voltage levels. For instance, the USB charger 200 may be able to supply an output voltage of 5V for normal USB charging, and may also be able to supply an output voltage of 12V for an accelerated USB charging. In other embodiments, the USB charger 200 is capable of supplying an output voltage $V_{out}$ at more than two different voltage levels.

In one embodiment, if no client device is connected to the USB charger 200, the USB charger outputs the lower voltage level (e.g., 5V). When a device is disconnected from the USB charger 200, and the output voltage level of the USB charger is not at the lower level when the client device is disconnected, the USB charger 200 lowers the output voltage to the lower voltage level.

USB charger 200 includes a USB connector 100, a bleeder circuit 203, an output voltage controller 205, and a charger controller 207. USB connector 100 allows the client device to receive power from the USB charger 200.

The output voltage controller 205 receives a signal from the client device 201 indicating which output voltage level the client device 201 can accept and sends a signal to the controller 207 to generate the desired output voltage. In some embodiments, the output voltage controller 205 senses the output voltage level of the USB charger 200 and determines an error value between the voltage level requested by the client device and the output voltage level of the USB charger 200. This error value may be provided to the controller 207 to produce the desired output voltage $V_{out}$. If the client device 201 requests an output voltage $V_{out}$ lower than the voltage level currently being outputted by the USB charge 200, the output voltage controller 205 may turn on and off bleeder 203 to decrease the output voltage level to the value requested by the client device 201. In some embodiments, the current voltage controller 205 senses the output voltage $V_{out}$ and turns off the bleeder 203 when the output voltage reaches the value requested by the client device 201.

Figure 3A:
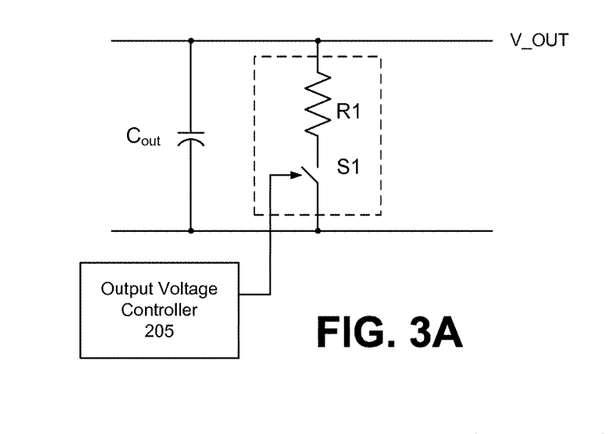
FIGS. 3A, 3B, 3C, 3D, and 3E illustrate five different embodiments of a bleeder circuit, according to one embodiment.
Figure 3B:
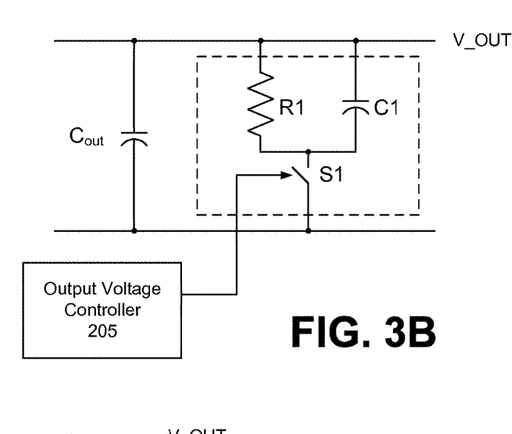
Figure 3C:
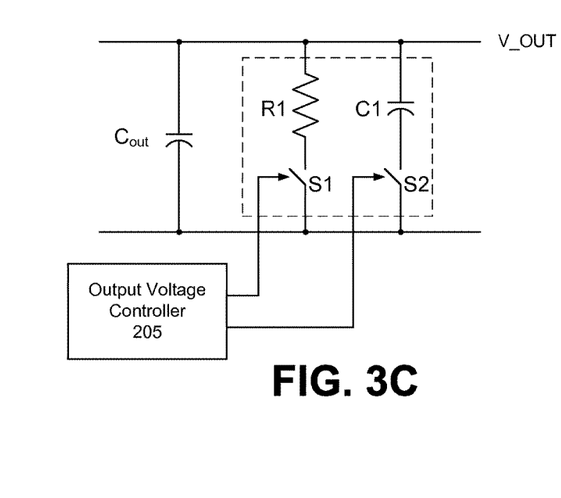

Bleeder 203 creates a discharging path for output capacitor ($C_{out}$) to discharge. When the client device 201 requests for an output voltage level, lower than the current voltage level being outputted by the USB charger 200, the bleeder 203 is turned on by the output voltage controller 205 and the charge stored in the output capacitor $C_{out}$ is discharged, thus lowering the voltage of the output of the USB charger 200. Different embodiments of the bleeder 203 are illustrated in FIGS. 3A, 3B, and 3C. In some embodiments, the bleeder is turned on when a client device is disconnected and the output voltage of the USB charger is not at a lower voltage level (e.g. at 5V).

Controller 207 receives a V_OUT SETTING signal from the output voltage controller 205 and turns on and off transistor $T_1$ accordingly. In some embodiments, the V_OUT SETTING signal is an error value between the output voltage level of the USB charger 200 and the voltage level requested by the client device 201. In other embodiments, the V_OUT SETTING signal may be a signal indicating which output voltage level to generate. For instance, the V_OUT SETTING may be a digital signal indicating that the client device requested a first voltage level (e.g. 5V) or a second voltage level (e.g. 12V). While in the specific embodiment of FIG. 2, the controller 207 controls the primary side of the USB charger 200, in some embodiments, other configurations that regulate the output voltage of the USB charger 200 may use the controller 207 to control the secondary side of the USB charger 200.

FIGS. 3A, 3B, 3C, 3D, and 3E illustrate five different embodiments of the bleeder 203. The bleeder of FIG. 3A includes resistor R1 and switch S1. In some embodiments, R1 is a physical resistor. In other embodiments, R1 is a resistance of switch S1 when switch S1 is closed. In yet other embodiments, resistor R1 includes the resistance of a physical resistor and a resistance of switch S1 when switch S1 is closed. Switch S1 is controlled by output voltage controller 205. When switch S1 is closed, a discharging path for $C_{out}$ is created through R1. The discharging speed of $C_{out}$ can be determined based on the value of the resistance of resistor R1. For instance, the output voltage may be $$V_{out} = V_0 e^{-\frac{t}{C_{out} \times R1}} \quad (1)$$

where $V_0$ is the value of the output voltage $V_{out}$ when switch S1 is turned on. Therefore, the amount of time to reduce the output voltage from $V_{dd1}$ to $V_{dd2}$ is given by $$t = C_{out} \times R1 \times \ln\left(\frac{V_{dd1}}{V_{dd2}}\right) \quad (2)$$

After the output voltage reaches the desired voltage level, the output voltage controller may turn off switch S1 to prevent further discharge of $C_{out}$ through R1.

Figure 4A:
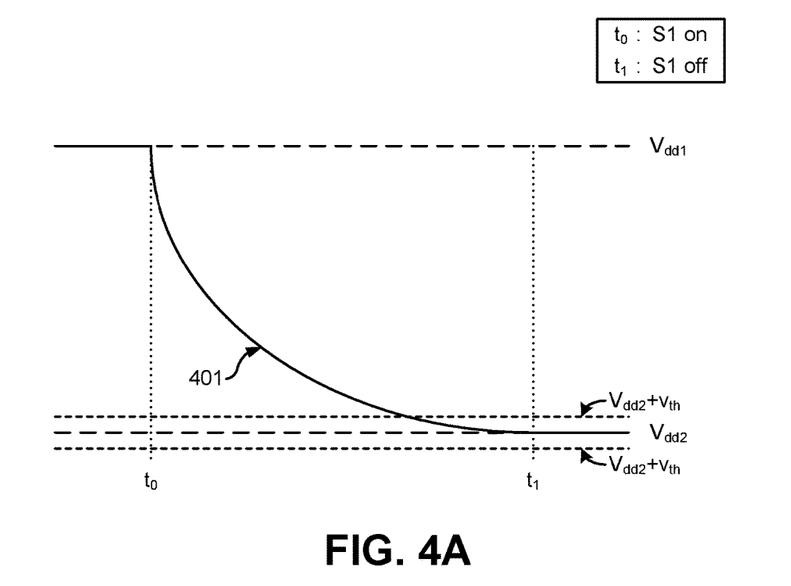
FIG. 4A illustrates a graph of the output voltage of the USB charger using the bleeder circuit of FIG. 3A, according to one embodiment.

FIG. 4A illustrates a graph of the output voltage 401 of the bleeder circuit of FIG. 3A as a function of time. At $t_0$, when switch S1 is closed, the output voltage starts lowering from a first voltage level $V_{dd1}$ to a second voltage level $V_{dd2}$. In one embodiment, the output voltage 401 reduces according to equation (1). Once the output voltage 401 reaches the second voltage level $V_{dd2}$, switch S1 is opened and the output voltage 401 is held constant at $V_{dd2}$. After switch S1 is opened, the voltage level of output voltage 401 may be sensed by output voltage controller 205 and output voltage controller 205 may generate the corresponding V_OUT SETTING signal. After switch S1 is opened, any discharge of output capacitor $C_{out}$ may be done through a load connected via the USB connector 100.

The bleeder circuit of FIG. 3B includes resistor R1, capacitor C1 connected in parallel to resistor R1, and switch S1. When switch S1 is closed, part of the charge stored in $C_{out}$ is transferred to C1. The amount of charge transferred to C1, and thus, the output voltage after the charge is transferred, is proportional to the capacitance of $C_{out}$ and the capacitance of C1. For instance, the output voltage ($V_1$) after the charge has been transferred to C1 is given by $$V_1 = \frac{C_{out}}{C_{out} + C1} \times V_0 \quad (3)$$

Furthermore, the amount of time to transfer the charge from $C_{out}$ to C1 may depend on a value of the parasitic resistance of $C_{out}$ and/or C1.

Additionally, the charge stored in $C_{out}$ and the charge stored in C1 is discharged through R1. As a result, the output voltage of the USB charger 200 is given by $$V_{out} = V_1 e^{-\frac{t}{(C_{out} + C1) \times R1}} \quad (4)$$

where $V_1$ is the output voltage level after the charge has been transferred from $C_{out}$ to C1. Therefore, the amount of time to reduce the output voltage from $V_1$ to $V_{dd2}$ is given by $$t = (C_{out} + C1) \times R1 \times \ln\left(\frac{V_1}{V_{dd2}}\right) \quad (5)$$

Figure 4B:
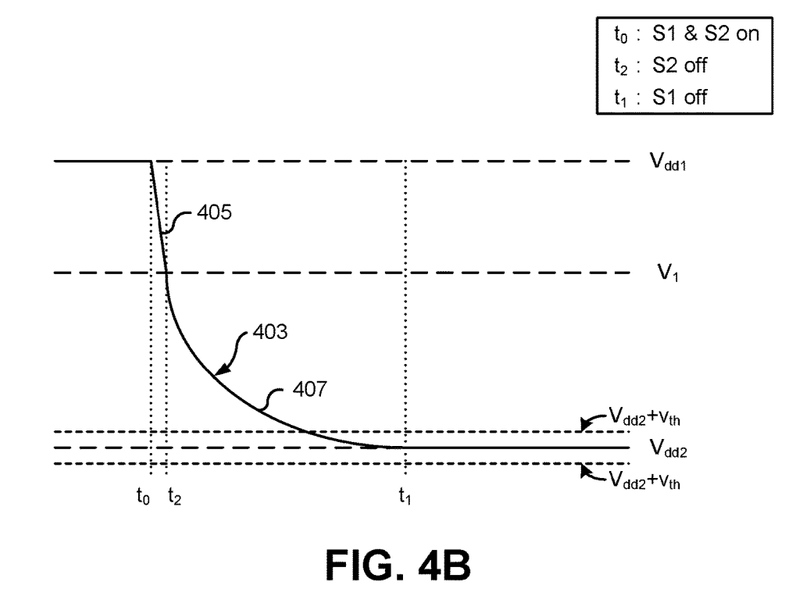
FIG. 4B illustrates a graph of the output voltage of the USB charger using the bleeder circuit of FIG. 3B or FIG. 3C, according to one embodiment.

FIG. 4B illustrates a graph of the output voltage 403 of the bleeder circuit of FIG. 3B as a function of time. At $t_0$, when switch S1 is closed, charge is transferred from output capacitor $C_{out}$ to capacitor C1 of FIG. 3B, thus lowering the voltage level of the output voltage 403. As a result the output voltage 403 rapidly decreases from the first voltage level $V_{dd1}$ to an intermediate voltage level V1. In one embodiment, the charge transfer speed is determined based on the value of the parasitic resistance of output capacitor $C_{out}$ and the parasitic resistance of capacitor C1. After the charge has been transferred from the output capacitor $C_{out}$ to the capacitor C1, the charge stored in output capacitor $C_{out}$ and capacitor C1 is dissipated through resistor R1 lowering the output voltage from the intermediate voltage level $V_1$ to the second voltage level $V_{dd2}$. In one embodiment, the output voltage 403 reduces according to equation (4). Once the output voltage 403 reaches the second voltage level $V_{dd2}$, switch S1 is opened and the output voltage 403 is held constant at $V_{dd2}$. Since the rate 405 at which the output voltage 403 reduces from $V_{dd1}$ to $V_1$ is proportional to the parasitic resistance of output capacitor $C_{out}$ and the parasitic resistance of capacitor C1, and the rate 407 at which the output voltage reduces from $V_1$ to $V_{dd2}$ is proportional to resistor R1, the rate 405 at which the output voltage 403 reduces from $V_{dd1}$ to $V_1$ is usually larger than the rate 407 at which the output voltage reduces from $V_1$ to $V_{dd2}$. Thus, the bleeder circuit of FIG. 3B beneficially allows the output voltage of USB charger 200 to reduce faster compared to a USB charger using the bleeder circuit of FIG. 3A.

The bleeder circuit of FIG. 3C includes resistor R1, capacitor C1, switch S1 connected in series with R1, and switch S2 connected in series with C1. If output voltage controller 205 determines that the output voltage of the USB charger 200 is larger than the voltage requested by the client device 201, the output voltage controller 205 closes switch S1 and S2. When switch S2 is closed, a portion of the charge stored in output capacitor $C_{out}$ is transferred to capacitor C1. The amount of charge transferred from $C_{out}$ to C1 is proportional to the capacitance of output capacitor $C_{out}$ and capacitor C1. Additionally, when switch S1 is closed, the charge stored in output capacitor $C_{out}$ and capacitor C1 is discharged through R1. Output capacitor $C_{out}$ and capacitor C1 are discharged until the output voltage of the USB charger 200 reaches the voltage requested by client device 201. When the output voltage of the USB charger 200 reaches the voltage level requested by the client device 201, output voltage controller 205 opens switch S1 to prevent output capacitor $C_{out}$ and capacitor C1 to be discharged through R1.

Figure 3D:
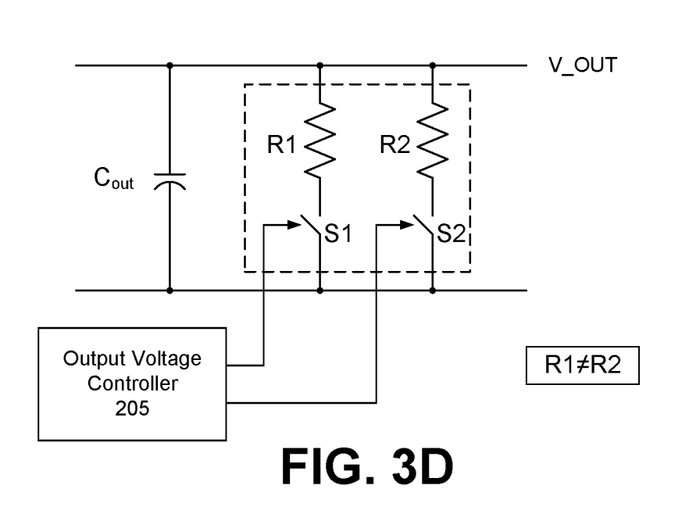

The bleeder circuit of FIG. 3D includes resistor R1 and R2, switch S1 connected in series with R1, and switch S2 connected in series with R2. Resistor R1 may have a small resistance and may be used to provide a fast discharge path to the output capacitor $C_{out}$. Resistor R2 may have a large resistance and may be used to provide a slow discharge path to the output capacitor $C_{out}$.

Figure 3E:
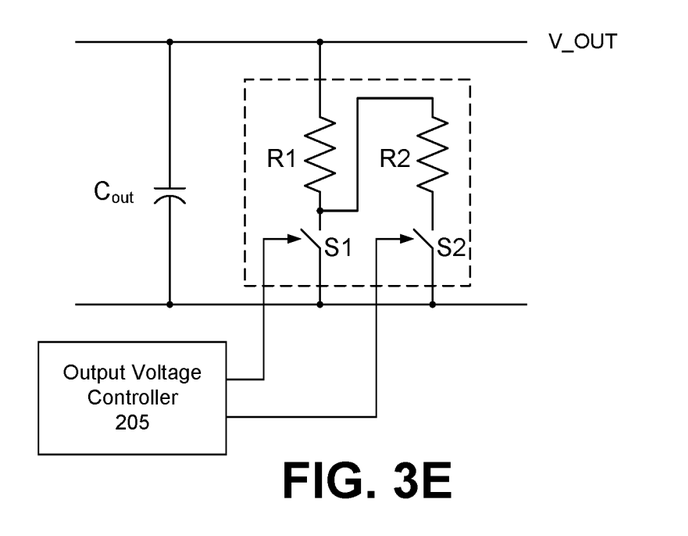

The bleeder circuit of FIG. 3E includes resistor R1, switch S1 connected in series with R1, and resistor R2 with switch S2 connected in parallel with switch S2. Resistor R1 may have a small resistance and resistor R2 may have a large resistance. When switch S1 is closed, resistor R1 provides a small resistance path for a fast discharge of output capacitor $C_{out}$. Additionally, when switch S1 is opened and switch S2 is closed, the series combination of resistor R1 and resistor R2 provides a large resistance path for a slow discharge of output capacitor $C_{out}$.

In the bleeder circuits of FIGS. 3D and 3E, if the output voltage controller 205 determines that the output voltage of the USB charger 200 is larger than the voltage requested by the client device 201, the output voltage controller 205 closes switch S1 and switch S2. When the output voltage reaches a certain threshold voltage, the output voltage controller 205 opens switch S1 and keeps switch S2 closed. When the output voltage of the USB charger 200 reaches the voltage level requested by the client device 201, output voltage controller 205 opens switch S2 to prevent output capacitor $C_{out}$ to be discharged through R2. Using a fast discharge resistor followed by a slow discharge resistor beneficially allows the bleeder circuit 203 to smoothly discharge output capacitor $C_{out}$ and reduces the amount of undershoot in the output voltage. Although the bleeder circuits of FIGS. 3D and 3E are described as having two resistors or two discharging stages, any number of resistors or discharging stages may be used depending on the amount of control desired for the discharging of the output voltage.

While the switches in the bleeder circuits 203 of FIGS. 3A through 3E are described as being controlled based on the output voltage, the switches of the bleeder circuits 203 may also be controlled by a timer, a logic circuit, or any combination thereof. For instance, by using a timer, excessive discharging and excessive heating may be reduced if the target voltage is not reached as expected.

Figure 5:
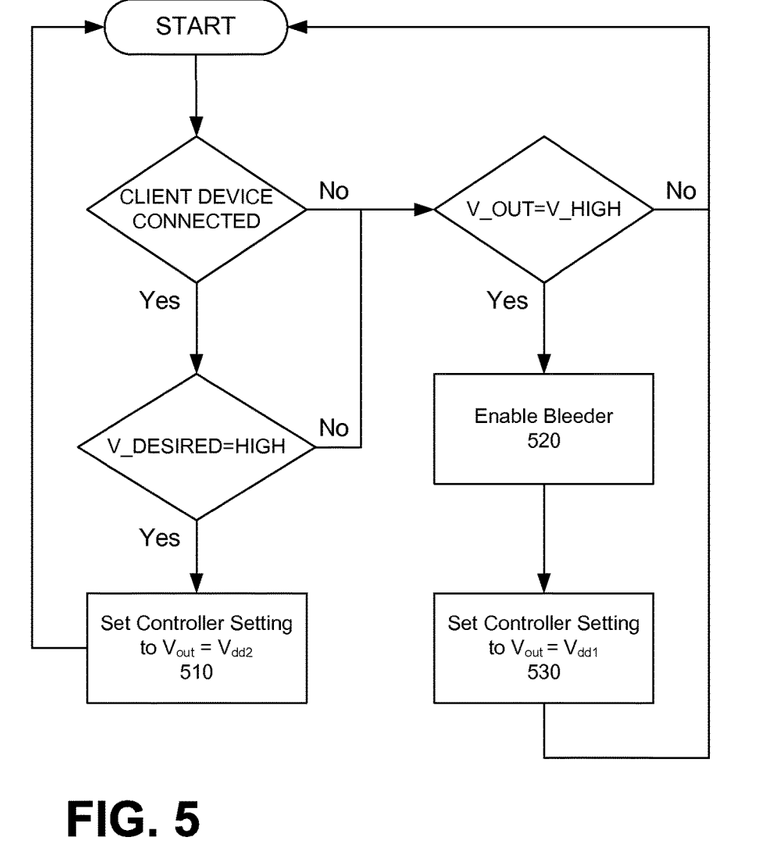
FIG. 5 illustrates a flow diagram for providing an output voltage at multiple levels, according to one embodiment.

FIG. 5 illustrates a flow diagram for providing an output voltage at multiple levels, according to one embodiment. A determination is made whether a client device 201 is connected to the USB charger 200. If a client device is connected, a determination is made whether the client device is requesting an output voltage at a higher voltage level (e.g. 12V). If the client device is requesting an output voltage at a higher voltage level, the controller 207 is set 510 to generate an output voltage $V_{out}$ at the higher voltage level $V_{dd2}$.

If the client device 201 requested an output voltage at a lower level, or a client device 201 is not connected to the USB charger 200, a determination is made whether the output voltage is at a higher voltage level. If the output voltage is at a higher level, the bleeder 203 is enabled 520 and the controller 207 is set 530 to generate an output voltage $V_{out}$ at the lower voltage level $V_{dd1}$.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a USB power supply voltage at multiple voltage levels through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A universal serial bus (USB) charger for providing power to a client device comprising:
   a USB connector configured to interface with the client device, and to receive a request for an output voltage at one of a plurality of voltage levels including a first voltage level and a second voltage level, the second voltage level higher than the first voltage level;

a converter circuit, an output of the converter circuit coupled to the USB connector, the converter circuit configured to convert an input voltage level to an output voltage level at one of the plurality of voltage levels including the first voltage level and the second voltage level, the converter circuit comprising an output capacitor coupled to the USB connector;

a bleeder circuit coupled to the output capacitor of the converter circuit, the bleeder circuit configured to discharge the output capacitor of the converter circuit responsive to the output voltage level of the converter circuit being greater than the first voltage level, the first bleeder circuit comprising:
 a first switch coupled to the output controller,
 a first bleeder resistor coupled to the output capacitor and the first switch, the first bleeder resistor configured to discharge the output capacitor when the first switch is closed,
 a second switch coupled to the output controller, and
 a second bleeder resistor coupled to the output capacitor and the second switch, the second bleeder resistor having a resistance higher than the first bleeder resistor, the second bleeder resistor configured to provide a slow discharge of the output capacitor when the first switch is opened; and an output controller coupled to the converter circuit and the bleeder circuit, the output controller configured to:
 responsive to a client device not being connected to the USB connector and the output voltage level of the converter circuit being controlled to be at the second voltage level:
  control the output voltage level of the converter circuit to be at the first voltage level,
  turn on the first switch and the second switch responsive to determining that the output voltage level of the USB charger is at the second voltage level, and
  turn off the first switch and the second switch responsive to determining that the first switch and the second switch have been on for a set amount of time.

2. The USB charger of claim 1, wherein the bleeder circuit further comprises:
 a bleeder capacitor, the bleeder capacitor coupled in parallel to the bleeder resistor, the bleeder capacitor configured to receive a portion of charge stored in the output capacitor when the first switch is closed.

3. The USB charger of claim 1, wherein the output controller is further configured to:
 turn off the first switch responsive to determining that the output voltage level of the USB charger is at a third voltage level, the third voltage level higher than the first voltage level and lower than the second voltage level; and
 turn off the second switch responsive to determining that the output voltage level of the USB charger is within a threshold level of the first voltage level.

4. The USB charger of claim 1, wherein the output controller is configured to turn on the first switch responsive to receiving the request for the output voltage to be at the first voltage level and determining that the output voltage level of the USB charger is at the second voltage level.

5. The USB charger of claim 4, wherein the output controller is further configured to turn off the first switch responsive to determining that the output voltage level of the USB charger is within a threshold level of the first voltage level.

6. The USB charger of claim 1, wherein the bleeder circuit further comprises:
 a second switch coupled to the output controller; and
 a bleeder capacitor coupled to the output capacitor and the second switch, the bleeder capacitor configured to receive a portion of the charge stored in the output capacitor when the second switch is closed.

7. The USB charger of claim 6, wherein the output controller is further configured to:
 turn on the first switch and the second switch responsive to determining that the output voltage level of the USB charger is at a second voltage level, the second voltage level higher than the first voltage level; and
 turn off the first switch responsive to determining that the output voltage of the USB charger is within a threshold level of the first voltage level.

8. A method for providing power to a client device in a plurality of voltage levels including a first voltage level and a second voltage level, the second voltage level higher than the first voltage level, the method comprising:
 determining, by a universal serial bus (USB) charger, whether the client device is connected to the USB charger; and
 responsive to determining that the client device is not connected to the USB charger and an output voltage of the USB charger is set to the second voltage level, the second voltage level higher than the first voltage level:
  setting the output voltage level to the first voltage level; and
  enabling a bleeder circuit, the bleeder circuit configured to discharge an output capacitor of the USB charger, the bleeder circuit including a first switch, a first bleeder resistor coupled to the output capacitor and the first switch, a second switch, and a second bleeder resistor coupled to the output capacitor and the second switch, comprising:
   turning on the first switch and the second switch responsive to determining that the output voltage level of the USB charger is at the second voltage level,
   turning off the first switch responsive to determining that the output voltage level of the USB charger is at a third voltage level, the third voltage level higher than the first voltage level and lower than the second voltage level, and
   turning off the second switch responsive to determining that the output voltage level of the USB charger is within a threshold level of the first voltage level.

9. The method of claim 8, further comprising:
 turning off the first switch responsive to determining that the output voltage level of the USB charger is within a threshold level of the first voltage level.

10. The method of claim 8, further comprising:
 receiving a request, at the USB charger, for the output voltage at the first voltage level or the second voltage level; and
 responsive to the received request being for the output voltage to be at the first voltage level:
  setting the output voltage to the first voltage level, and
  responsive to determining whether the output voltage level is higher than the first voltage level, enabling the bleeder circuit; and responsive to the received request being for the output voltage to be at the second voltage level:
setting the output voltage to the second voltage level.

11. The method of claim 10, further comprising:
responsive to determining that the requested first voltage is higher than the output voltage level setting the output voltage level to the first level.

12. The method of claim 8, wherein the first bleeder resistor configured to discharge the output capacitor when the first switch is on.

13. The method of claim 12, wherein the bleeder circuit further comprises:
a bleeder capacitor, the bleeder capacitor coupled in parallel to the first bleeder resistor, the bleeder capacitor configured to receive a portion of charge stored in the output capacitor when the first switch is on.

14. The method of claim 12, wherein the bleeder circuit further comprises:
a third switch; and
a bleeder capacitor coupled to the output capacitor and the third switch, the bleeder capacitor configured to receive a portion of the charge stored in the output capacitor when the third switch is on.

15. The method of claim 14, further comprising:
turning on the third switch responsive to determining that the output voltage level of the USB charger is at the second voltage level.

16. A universal serial bus (USB) charger for providing power to a client device comprising:
a USB connector configured to interface with the client device, and to receive a request for an output voltage at one of a plurality of voltage levels including a first voltage level and a second voltage level;
a converter circuit, an output of the converter circuit coupled to the USB connector, the converter circuit configured to convert an input voltage level to an output voltage level, the converter circuit comprising an output capacitor coupled to the USB connector;
a bleeder circuit coupled to the output capacitor of the converter circuit, the bleeder circuit configured to discharge the output capacitor of the converter circuit responsive to the output voltage level of the converter circuit being greater than the first voltage level, the bleeder circuit comprising:
a first switch coupled to the output controller,
a first bleeder resistor coupled to the output capacitor and the first switch, the first bleeder resistor configured to discharge the output capacitor when the first switch is closed,
a second switch coupled to the output controller, and
a second bleeder resistor coupled to the output capacitor and the second switch, the second bleeder resistor having a resistance higher than the first bleeder resistor, the second bleeder resistor configured to provide a slow discharge of the output capacitor when the first switch is opened; and
an output controller coupled to the converter circuit and the bleeder circuit, the output controller configured to:
turn on the first switch and the second switch responsive to determining that the output voltage level of the USB charger is at a second voltage level, the second voltage level higher than the first voltage level;
turn off the first switch responsive to determining that the output voltage level of the USB charger is at a third voltage level, the third voltage level higher than the first voltage level and lower than the second voltage level; and
turn off the second switch responsive to determining that the output voltage level of the USB charger is within a threshold level of the first voltage level.

17. The USB charger of claim 16, wherein the output controller is configured to turn on the first switch responsive to receiving the request for the output voltage to be at the first voltage level and determining that the output voltage level of the USB charger is at the second voltage level.

18. The USB charger of claim 16, wherein the output controller is further configured to turn off the first switch responsive to determining that the output voltage level of the USB charger is within a threshold level of the first voltage level.

19. The USB charger of claim 16, wherein the bleeder circuit further comprises:
a bleeder capacitor, the bleeder capacitor coupled in parallel to the first bleeder resistor, the bleeder capacitor configured to receive a portion of charge stored in the output capacitor when the first switch is closed.

\* \* \* \* \*